United States Patent [19]

Yamanashi et al.

[11] 4,019,203

[45] Apr. 19, 1977

[54] FILTERS FOR TAPE RECORDING SYSTEMS

[75] Inventors: Bill Soichro Yamanashi, Durham, N.C.; Tadashi Fujita, Ishikawa, Japan

[73] Assignee: Electromechanics Research, Durham, N.C.

[22] Filed: Oct. 31, 1975

[21] Appl. No.: 627,798

[52] U.S. Cl. .................................. 360/78; 333/79; 360/67; 360/93; 360/137
[51] Int. Cl.² ................. H01H 7/14; G11B 21/08; G11B 5/02; G11B 15/00
[58] Field of Search ............... 360/67, 68, 78, 71, 360/90–96, 137; 333/79

[56] References Cited

UNITED STATES PATENTS

| | | | |
|---|---|---|---|
| 3,564,157 | 2/1971 | Kato et al. | 360/78 |
| 3,817,539 | 6/1974 | Kawada et al. | 360/71 |

*Primary Examiner*—Robert S. Tupper
*Attorney, Agent, or Firm*—B. B. Olive

[57] ABSTRACT

A tape recorder having a solenoid coil-plunger type actuator for performing a mechanical function within the recorder incorporates the solenoid coil into the circuitry to serve as the inductive component of a filter adapted to filter the noise components produced by the DC tape driving motor, or to filter the output of the DC wave rectifier or to filter other outputs within the recorder.

7 Claims, 10 Drawing Figures

FILTERS FOR TAPE RECORDING SYSTEMS

BACKGROUND OF THE INVENTION

1. Field of the Invention

The invention relates to filters employed in the power circuitry of tape recording and/or playback systems. In the preferred embodiment, the invention relates to a ripple filter (i.e., choke-input or capacitor-input filter) adapted to filter the noise components created by the DC motor in a conventional multitrack, endless tape recording/playback system wherein the inductive component of said filter comprises the solenoid coil of the channel changing mechanism.

2. Description of the Prior Art

It is well known that the tape driving DC motor of a conventional tape recorder produces pulse-type noise components caused by rotor-to-brush arcing within the motor. The prior art tape recorders provide a number of circuit designs which are adapted to prevent these noise components from entering into the amplifier portion of the tape recorder circuitry thereby reducing the signal-to-noise ratio to acceptable levels for recording and high fidelity playback.

Heretofore, three types of noise reduction have been in practical use: (1) the use of a low noise level DC motor; (2) the use of an AC motor; and (3) the insertion of a filter network between the motor driving circuitry and the amplifier circuitry. The principal disadvantage of the first approach is that low noise level DC motors are costly. Furthermore, even with the best of these low noise level motors, the elimination of the noise is still incomplete and subject to increase upon wearing of the brush-rotor contact and not generally acceptable for high quality recording and playback. The use of an AC motor, which does not cause brush injection of current, effectively elminates the noise; however, this approach has the disadvantage of not being adaptable to battery operated recorders. An additional setback of the use of an AC motor is that it produces considerably more heat than an equivalent DC motor and, therefore, reduces the life of various electronic components within the recorder. The third approach of inserting the filter network between the DC motor and the amplifier circuitry accomplishes the noise elimination effectively in principle; however, in practice the optimum noise filtering requires an appropriate inductance-capacitance combination which in turn requires added parts and additional cost in manufacturing.

The three types of filter networks commonly used to filter out the noise produced by the DC motor are: (a) an inductance L-type filter in which an inductor is inserted in series between the DC power source and the tape driving motor and a capacitor is inserted parallel to the motor (see FIG. 4A); (b) a resistance L-type filter as in (a) above wherein the inductor is replaced by a resistor (FIG. 4B); (c) a pi-type filter in which an inductor is inserted in series between the DC power source and the tape driving motor and a capacitor is inserted on each side of the inductor (FIG. 4C); and (d) a pi-type filter having both a resistor and an inductor connected in series (FIG. 4D).

The efficiency of a filter network is proportional to the time constant of such a network. Hence, in principle, the greater the inductance and the capacitance, the more efficient the filter network. In practice, the cost of capacitors and inductors increases in proportion to the capacitance or inductance of such a component. In order to compromise between the filtering efficiency and the manufacturing cost, the inductor of a typical filter has been replaced with a relatively less expensive resistor and an inductor of less inductance. Unfortunately, the use of a resistor in the filter network results in a voltage drop across the resistor.

The use of a pi-type network has the disadvantage of requiring at least three components which results in an inescapable cost increase. It is believed that no prior art tape recorder provides an efficient DC motor noise filtering circuit without utilizing additional high inductance and high capacitance components in the inserted filter network. Thus, there is an acute need for a simple and efficient filtering circuitry which requires fewer additional costly components and achieves the high efficiency necessary for recording and high fidelity playback.

The typical eight-track, four-channel tape recorder has a solenoid coil and plunger arrangement connected in series with a channel changing switch. In such an arrangement, the switch supplies a momentary impulse to the solenoid coil which in turn activates its plunger. Through appropriate mechanical linkage, the plunger serves to move the magnetic head to the next channel and to index the channel indicator lights to indicate the appropriate channel. A more detailed description of conventional channel changing mechanisms can be found in numerous publications, including U.S. Pat. No. 3,564,157. The solenoid coils in present use are used only during the channel changing operation as a means for moving the plungers. Since such solenoid coils possess high inductance and are relatively expensive, it is highly desirable to incorporate these coils into the power circuitry of the recorder to perform other functions. It is believed that the prior art does not teach suitable means for using the solenoid coil for purposes other than channel changing.

It is a purpose of the present invention to incorporate the conventional channel changing solenoid coil into the power circuitry of a multitrack endless tape recorder as the inductive component in either a filter for the noise impulses from the DC motor or a filter for the DC wave rectifier.

Also well known in the art is that in recent years certain tape systems, in particular cassette systems, have been provided with an automatic reverse mechanism for reversing the direction of the tape at each end of the tape. Such reverse mechanisms are achieved typically by adhering a metal foil strip near the ends of the tape and providing a sensor to detect the strip, thereby actuating a solenoid coil-plunger arrangement for reversing the tape direction. It is a purpose of the present invention to utilize such a solenoid coil as the inductive component of a filter in the cassette system or other such tape system.

Another use of solenoid coil-plunger arrangements in tape recording systems is their use in ejecting tape cartridges. According to the present invention, it is also contemplated that such a solenoid coil may be used as the inductive component of a filter in the tape system.

The present invention recognizes that virtually any tape system having a solenoid coil and plunger arrangement useful as an electromechanical actuator during momentary current pulses through the solenoid can also utilize the solenoid as the inductance in a filter network.

SUMMARY OF THE INVENTION

In the preferred embodiment, the conventional channel changing solenoid coil of a multitrack endless tape recorder is utilized as the inductive element of a ripple filter in the recorder circuitry. The filter is a choke-input, L-type filter useful for filtering the noise components created by the rotor-to-brush arcing within the DC tape driving motor. Thus, in the preferred embodiment, the solenoid coil is adapted to perform its normal channel changing function as well as its novel and useful filtering function. According to the invention, solenoid coils having a number of different functions are adapted to be used as the inductive components of various filters within the tape system; for example, as a filter for the DC wave rectifier or as a noise filter for the DC tape driving motor.

DESCRIPTION OF THE PREFERRED EMBODIMENT

Figure 1:
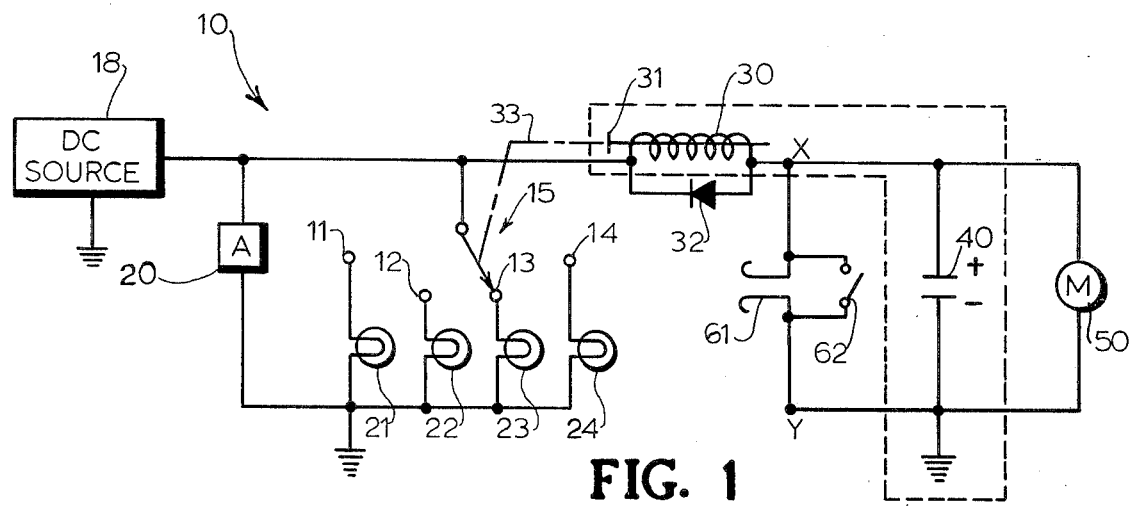
FIG. 1 is a circuit diagram of the preferred embodiment of the invention circuitry showing the channel changing solenoid coil as the inductive component in an L-type motor noise filter network.

FIG. 1 illustrates a portion of the circuitry 10 of a four-channel, eight-track endless tape recorder which includes a 12-volt DC source 18 (battery or rectifier), an amplifier 20 and a DC tape driving motor 50. Circuitry 10 also includes a channel changing solenoid coil 30 and plunger 31 connected in parallel with a back-current preventing diode 32. Positioned in parallel between motor 50 and amplifier 20 is a conventional rotary switch 15. Switch 15 serves to selectively energize one of channel indicator lamps 21, 22, 23, 24 as switch 15 is indexed between contact points 11, 12, 13, 14 during the channel changing operation by plunger 31 in a manner well known to those skilled in the art.

A manually operable channel changing switch 62 and a conventional metal foil sensor 61 are positioned in parallel with motor 50 to facilitate channel changing. When either switch 62 is momentarily closed by the operator or sensor 61 is momentarily closed by the conducting foil adhered to the end of each channel of the magnetic tape, a closed circuit is created between points X and Y and the current passing through motor 50 momentarily becomes zero. The current passing through solenoid 30 during normal operation is approximately 100 milliamperes and increases to approximately 2.0 amperes during channel changing. This increased current through solenoid coil 30 is sufficient to actuate plunger 31 and thereby index rotary switch 15 and to move the magnetic head (not shown) for changing channels in the manner well known to those skilled in the art.

In addition to performing its normal channel changing function, solenoid 30 comprises the inductive component of an L-type DC motor noise filter which is enclosed by the dashed lines in FIG. 1. This filter also includes a capacitor 40 which is connected in parallel with motor 50. Solenoid coil 30 is a standard channel changing solenoid with an inductance of 20 millihenries and an internal resistance of approximately 6 ohms. Capacitor 40 has a capacitance of 0.5 microfarads. During normal operation of the recorder, motor 50 is continuously energized by DC source 18, and solenoid 30 and capacitor 40 serve to filter out the noise pulses produced by the rotor-to-brush arcing within motor 50.

Figure 4A:
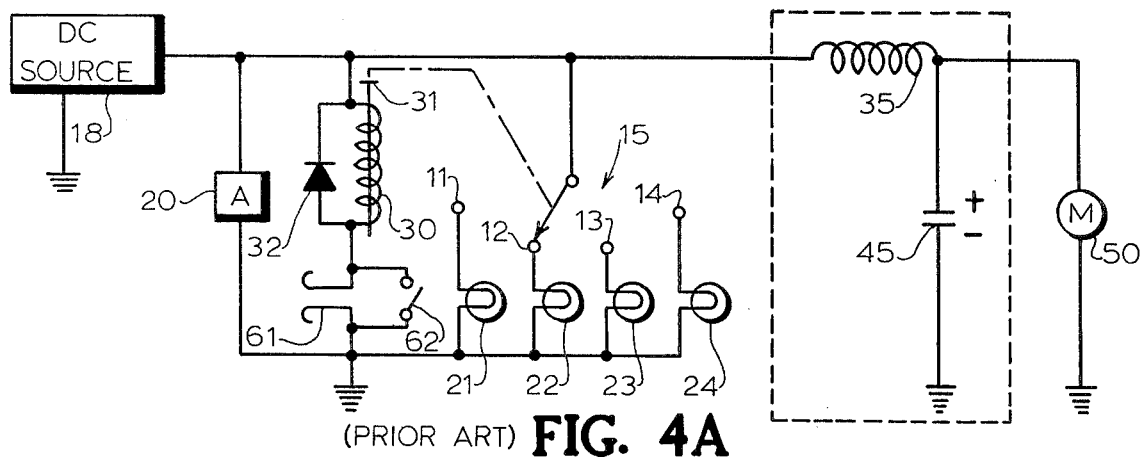
FIG. 4A is a circuit diagram of a typical prior art recorder having an inductance L-type filter (shown in dashed lines) for filtering DC motor noise and in which the solenoid of the channel changing mechanism is utilized only for actuating its plunger during the channel changing operation.
Figure 4B:
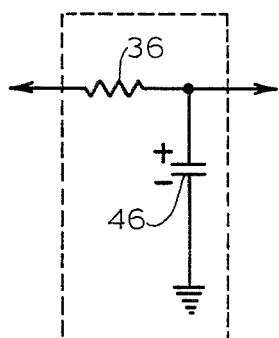
FIG. 4B illustrates another prior art filter network similar to the network of FIG. 4A.
Figure 4C:
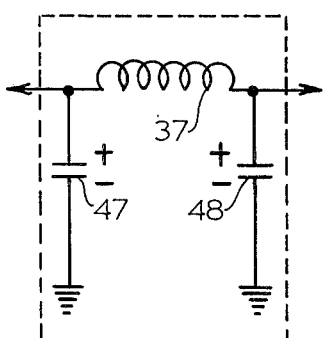
FIG. 4C illustrates a third prior art filter network.
Figure 4D:
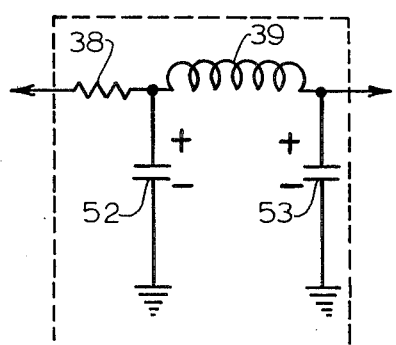
FIG. 4D illustrates a fourth prior art filter network.

A typical DC motor noise filter of the prior art, such as the one shown in dashed lines in FIG. 4A, utilizes an inductor of approximately 0.05 millihenries and a capacitor of approximately 470 microfarads. By utilizing solenoid coil 30 (20 millihenries) as the inductive component of such a filter, an equivalent time constant ($2\pi fLC$) can be achieved with a capacitor of approximately 0.12 microfarads. The savings in eliminating the inductor and reducing the size of the capacitor are obvious. Of course, a larger capacitor can be employed to provide a higher filtering efficiency.

The normal function of solenoid 30 (retracting plunger 31 during the channel changing operation) and of motor 50 (driving the magnetic tape) are not affected by the additional function of the solenoid coil 30 as a part of the filter network. The 100 milliampere current normally passing through coil 30 while motor 50 is running is much less than the current required to retract plunger 31. During the channel changing operation, power to motor 50 is momentarily cut off; however, the motion of motor 50 is not affected by the momentary absence of power since motor 50 includes a flywheel.

Figure 2:
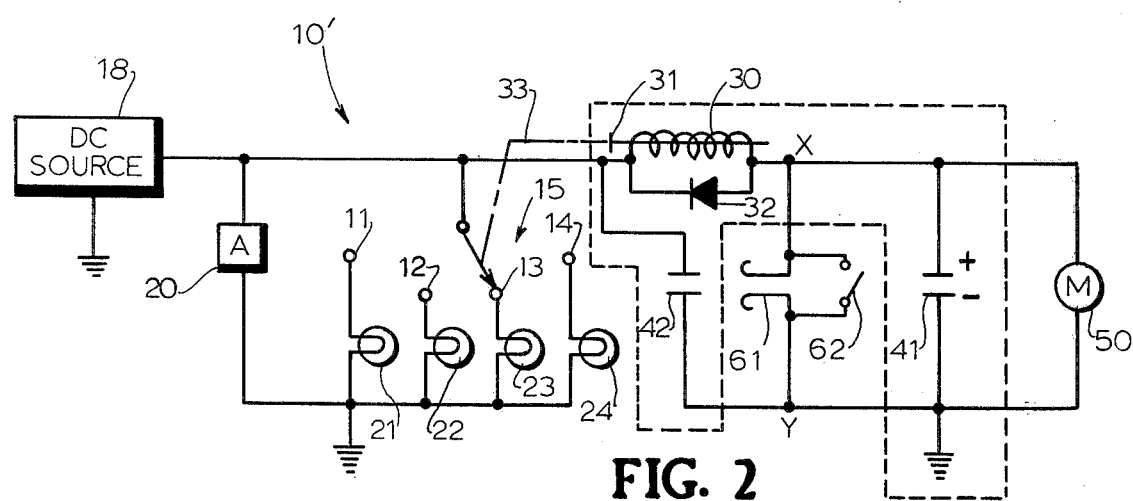
FIG. 2 is a circuit diagram of an alternative embodiment of the invention circuitry wherein the channel changing solenoid coil is used as the inductive component in a pi-type motor noise filter network.

FIG. 2 illustrates an alternative circuit 10' which includes a pi-type filter in dashed lines. This pi-type filter includes two capacitors 41, 42 connected in parallel with motor 50. Capacitors 41 and 42 are relatively inexpensive and have a low capacitance of approximately 0.5 microfarads. Otherwise, circuit 10' is identical to circuit 10 illustrated in FIG. 1.

Figure 3:
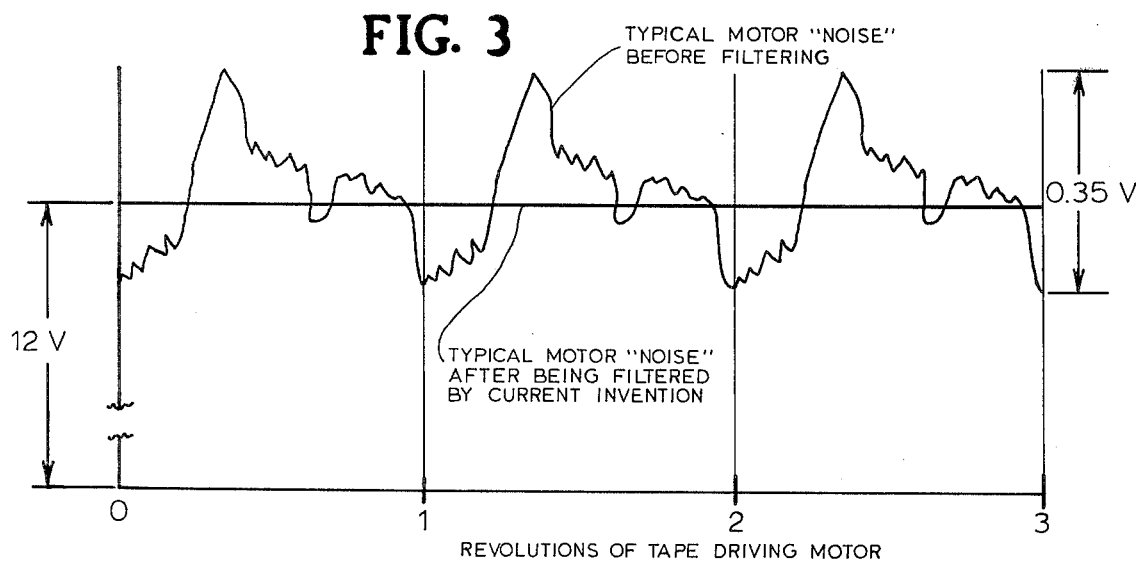
FIG. 3 is a graph which illustrates one example of the pulse-type noise components produced by the rotor-to-brush arcing of a tape driving DC motor both before and after filtering by the present invention.

FIG. 3 is a graph illustrating the pulse-type noise components created by the arcing within motor 50 and transferred to amplifier 20 both with and without a noise filter. The noise pulse cycle substantially repeats itself with each revolution of the tape driving motor 50.

The noise filter is chosen to have a time constant that will smooth out the pulses according to the demands of the particular recording system. In choosing the appropriate filter for a given recording system, it should be understood that the brushes in the DC tape driving motor will normally wear with time with a resulting increase in noise generation.

Figure 5:
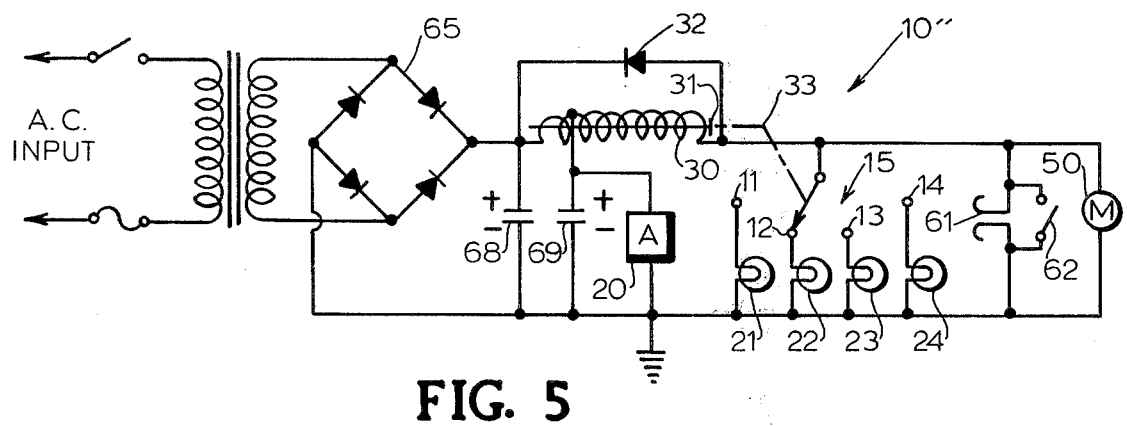
FIG. 5 illustrates an alternative embodiment of the invention in which the channel changing solenoid coil is utilized as the inductive component in a filter for the DC power source.

Referring to FIG. 5, an alternative embodiment circuit 10'' is shown in which solenoid coil 30 is utilized as the inductive element in a pi-type filter for the DC wave rectifier of a conventional four-channel, eight-track tape recorder which is powered from an AC outlet. Solenoid coil 30 and plunger 31 perform their usual functions during the channel changing operation. In addition, solenoid coil 30 in combination with capacitors 68 and 69 form a capacitor-input filter for the DC wave rectifier. Capacitors 68 and 69 each have a capacitance of approximately 0.5 microfarads. As shown in FIG. 5, the line from solenoid coil 30 to capacitor 69 is tapped onto solenoid coil 30 intermediate its length in order to include only the desired amount of inductance in the filter network and to reduce the resistance which the coil adds to the power circuitry.

In recorders having more than one power supply in the amplifier, the tapping technique illustrated in FIG. 5 may be used to provide a filter for each such power supply. For example, the solenoid coil may be tapped at two points so as to use a first portion of the coil as the inductive component in a filter for one power supply and to use a second portion of the coil in a filter for another power supply.

Figure 6:
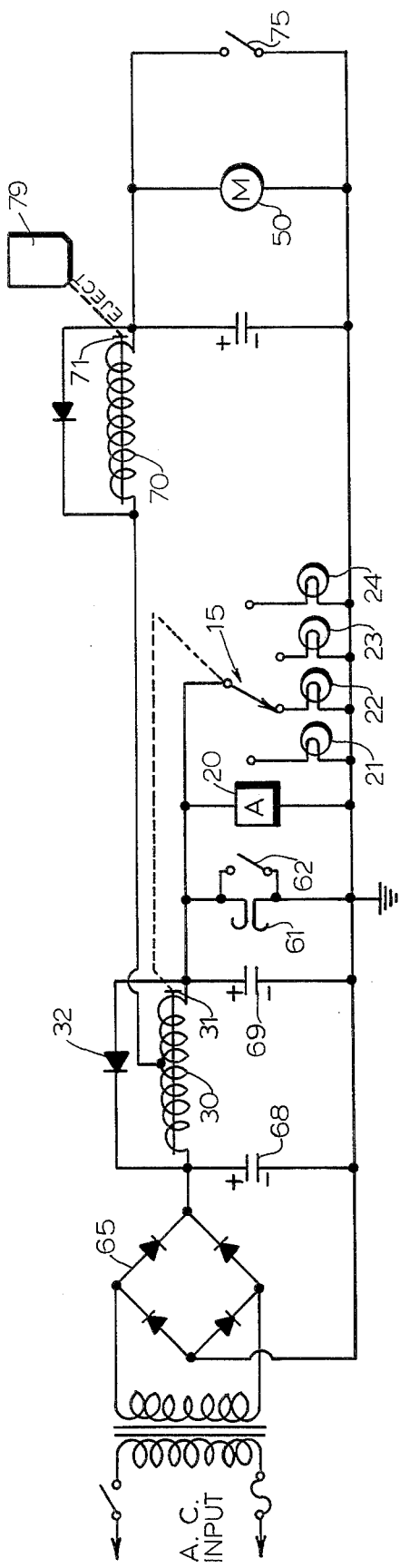
FIG. 6 illustrates a recorder circuitry having a channel changing solenoid coil utilized in a ripple filter for the DC wave rectifier and having an ejection solenoid utilized in a filter for the DC motor noise.

FIG. 6 illustrates a tape recorder circuitry having two solenoid-plunger actuator mechanisms with both solenoid coils 30 and 70 being used as ripple filters in accordance with the present invention. Solenoid coil 30 is part of the conventional channel changing mechanism. In addition, solenoid coil 30 is used as the inductive component of a filter for the DC wave rectifier in the manner previously discussed with reference to FIG. 5. Solenoid coil 70 and plunger 71 represent a conventional electromechanical actuator for ejecting a cassette or cartridge 79 whenever manually operable ejection switch 75 is closed. According to the teachings of the invention, solenoid coil 70 has been connected in the power circuitry to serve as the inductive component of an L-type filter for filtering the DC motor noise component. In the embodiment shown in FIG. 6, solenoid coil 30 has been tapped intermediate its length so as to present less resistance to the overall power circuitry.

Figure 7:
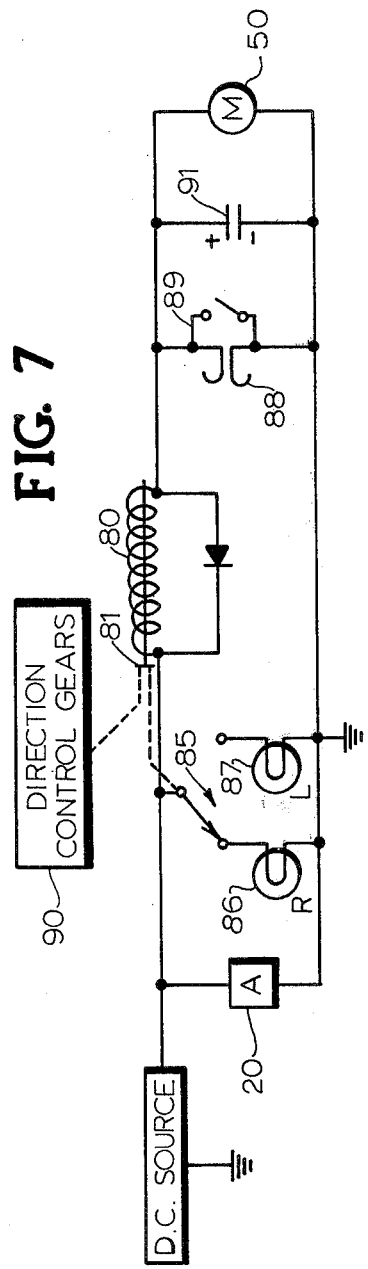
FIG. 7 illustrates the circuitry of a cassette or reel-to-reel system in which a solenoid coil and plunger arrangement serves as the actuator for tape drive reversal and with such solenoid coil utilized in a filter for the DC motor noise.

FIG. 7 depicts a portion of the circuit of a cassette tape system or reel-to-reel tape system having a solenoid coil 80 and plunger 81 which serve as the electromechanical actuator for reversing the direction of tape drive by moving the direction control gears 90. The activation of coil 80 and plunger 81 is controlled by either an end detecting sensor 88 or a manually operable tape direction switch 89. Sensor 88 may take the form of a sensor which detects the presence of a metal foil strip adhered to the ends of the tape, a torque sensing device or other means to sense that the tape has nearly completed its play in one direction. Plunger 81 also serves to index a switch 85 between two contacts in order to selectively energize one of direction indicator lamps 86, 87. The above electromechanical actuator function of solenoid coil 80 is well known in the art; however, in accordance with the present invention, solenoid coil 80 is also inserted into the power circuitry and, in combination with capacitor 91, constitutes an L-type filter for the DC motor noise components.

In summary, the present invention provides a unique, simple and highly efficient means for filtering the noise pulses from the DC motor of a tape recording system, for filtering the output of the rectifier in such a system or for other filtering functions within the system. By utilizing high inductance solenoid coils as the inductive components in these filters, the cost of additional filter inductors is eliminated and, due to the high inductance of the solenoid coils, the capacitance within the filters can be greatly reduced while maintaining the same or a higher filtering efficiency. These advantages are achieved without impairing the normal function of the solenoid coil in the channel changing operation, cassette reversing operation, cartridge or cassette eject operation or other solenoid use.

As used in the description, the terms "tape recorder", "tape recording system", and the like, include recording/playback systems as well as playback systems having no recording capabilities. The present invention applies equally well to both types of systems.

What is claimed is:

1. In a tape player-recorder of the type having a load in the nature of a drive motor, amplifier, or the like, a DC power source, normally open momentary switch means and circuitry electrically connecting said load and switch means to said power source, said switch means being adapted for momentarily closing in response to the sensing of a selected tape position or the operation of a manual control, an improved filter circuitry comprising in combination:
   a. solenoid actuator means including a solenoid coil and means responsive to sufficient level of energization of said coil for actuating an electromechanical operator associated with a switch, ejector, channel shifter, or the like, within said player-recorder;
   b. electrical connector means for connecting said switch means and said load in parallel and further connecting said solenoid coil in series with said power source and between said power source and one side of the parallel circuitry which includes the load and the momentary switch means thereby providing a fixed current path from said source to said load through said coil and a selectively operable shorting path parallel to said load through said switch means; and
   c. capacitor means electrically connected to said solenoid coil of said actuator means in an operative position to form a filter circuit in combination with said solenoid coil;

whereby during normal operation of said player-recorder said momentary switch means is open and a normal operating current flows through the solenoid coil for powering said load while said solenoid coil in conjunction with said capacitor means simultaneously provides a filtering action associated with said load and in correspondence with momentary closing of said switch means said solenoid coil is energized in a manner to cause said actuator means to actuate said electromechanical operator.

2. The apparatus of claim 1 wherein said player-recorder is a cartridge-type player-recorder using a multi-track forming multi-channel endless tape with detectable channel ends, said load is a DC tape driving motor, said momentary switch means includes a channel end sensor for momentarily closing said switch means at the end of the play of each channel to produce momentary surges of current through said coil, said actuator means is operative during said momentary surges of current through said coil to shift the magnetic tape head of said player-recorder from channel to channel and said capacitor means comprises a single capacitor connected to one side of said coil and electrically connected in parallel with said tape driving motor and momentary switch means to form an inductance L-type filter network.

3. The apparatus of claim 1 wherein said player-recorder is a cartridge-type player-recorder using a multi-track forming multi-channel endless tape with detectable channel ends, said load is a DC tape driving motor, said momentary switch means includes a channel end sensor for momentarily closing said switch means at the end of the play of each channel to produce momentary surges of current through said coil, said actuator means is operative during said momentary surges of current through said coil to shift the magnetic tape head of said player-recorder from channel to channel and said capacitor means comprises a pair of capacitors connected in parallel with said tape driving motor and momentary switch means to form a pi-type filter network.

4. The apparatus of claim 1 wherein said DC power source includes a bridge rectifier and said load includes an amplifier.

5. The apparatus of claim 1 wherein said momentary switch means includes a manually operable eject switch and said actuator means operator is operative during momentary surges of current through said solenoid coil produced by operation of said eject switch to mechanically eject the tape cartridge or cassette.

6. The apparatus of claim 1 wherein said momentary switch means includes means for detecting the end of tape drive in a given direction and said actuator means is operative during the momentary surges of current through its solenoid coil produced by operation of said momentary switch means to reverse the direction of tape play.

7. In a cartridge-type player-recorder using a multi-track forming multi-channel endless tape with detectable channel ends and having:
   a. a magnetic tape head operatively associated with said tape at a position adjacent thereto;
   b. shifting means for shifting said head from channel to channel;
   c. drive means for driving said tape past said head;
   d. sensor switch means including means for sensing the end of each respective channel on said tape during movement thereof and momentarily closing in response thereto;
   e. manual switch means adapted to being momentarily closed to sequentially advance the play of said player-recorder from channel to channel, said sensor switch means and manual switch means being connected in parallel circuitry;
   f. a DC power source for powering said player-recorder;

an improved filter circuitry means, comprising:
   g. solenoid actuator means including a solenoid coil and operator means responsive to momentary surges of current through said coil produced during momentary closing of either said sensor switch means or manual switch means to actuate said shifting means;
   h. electrical connector means for connecting said sensor switch means and manual switch means parallel circuitry in parallel with said drive means and for connecting said coil of said actuator means in series with said power source; and
   i. at least one capacitor connector to one end of said coil and electrically connected in parallel with said drive means and switch means parallel circuitry to establish a filter circuit utilizing said capacitor and coil for the filtering action produced thereby.

* * * * *